United States Patent [19]

Bennett

[11] Patent Number: 4,596,417
[45] Date of Patent: Jun. 24, 1986

[54] COMBINATION LOADING RAMP AND TAILGATE CLOSURE DEVICE

[76] Inventor: Kenneth D. Bennett, P.O. Box 216, Tazewell, Tenn. 37979

[21] Appl. No.: 758,087

[22] Filed: Jul. 23, 1985

[51] Int. Cl.⁴ ............................................. B62D 25/00
[52] U.S. Cl. ...................................... 296/61; 414/537
[58] Field of Search .................... 296/50, 51, 57 R, 60, 296/61, 62, 26; 414/537

[56] References Cited

U.S. PATENT DOCUMENTS

| | | | |
|---|---|---|---|
| 3,352,440 | 11/1967 | Wilson | 296/61 X |
| 3,713,553 | 1/1973 | Curtis et al. | 296/61 X |
| 3,976,209 | 8/1976 | Burton | 296/61 X |
| 3,977,545 | 8/1976 | Lloyd | 296/61 X |
| 3,989,148 | 11/1976 | Donohue | 414/537 |

*Primary Examiner*—Robert B. Reeves
*Assistant Examiner*—Russell D. Stormer
*Attorney, Agent, or Firm*—Pitts and Brittian

[57] ABSTRACT

A combination loading ramp and tailgate closure device (10) is provided for use in connection with a gated cargo bed (12) of a truck. The device (10) is releasably mounted on the rearward portion of the truck having the tailgate (24) in an extended position. In this mode of operation, the device (10) serves to extend the cargo bed (12) of a truck by a distance approximating the height of the tailgate (24) when the tailgate is in a closed position. The device (10) can ultimately be removed from the rearward portion of a truck and positioned in an on-loading and off-loading ramp mode for moving a wheeled vehicle or the like into the truck cargo bed. Various materials can be used for manufacturing this device, and it is envisioned that the device can be fabricated from a suitable rigid material such as steel, aluminium, or the like, or from suitable plastics having the strength and durability necessary to withstand the wear occasioned by normal usage.

14 Claims, 8 Drawing Figures

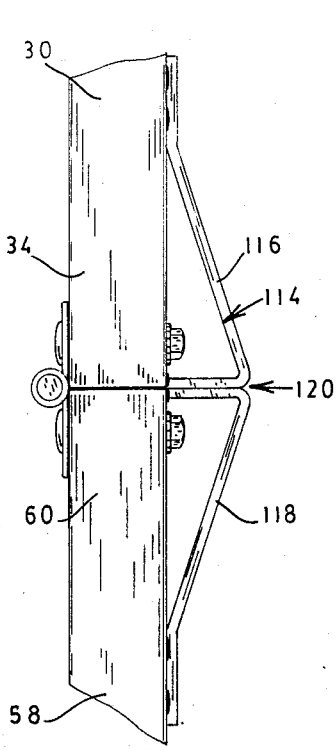
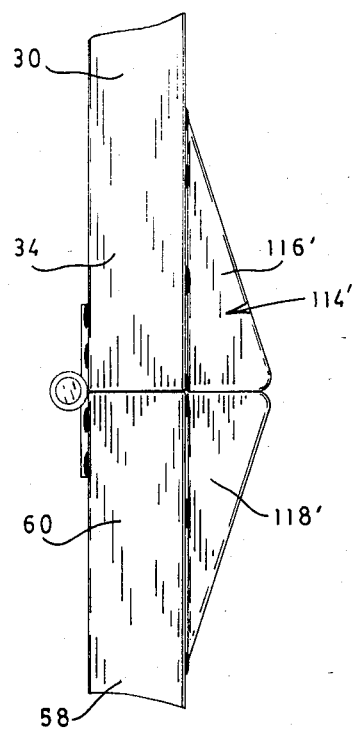
Fig. 4A  Fig. 4B
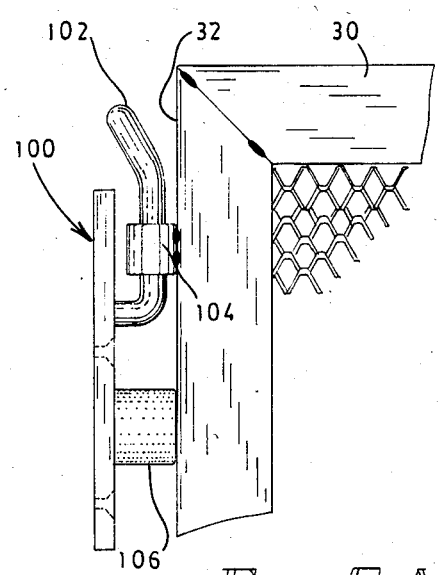
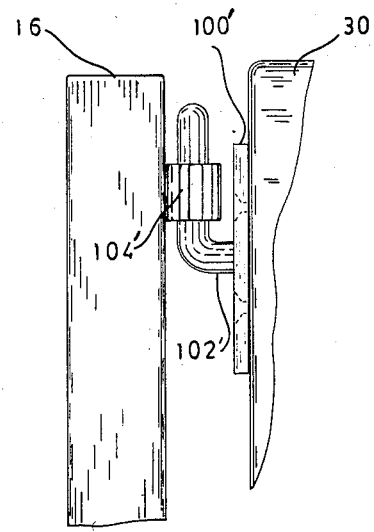
Fig. 5A  Fig. 5B

COMBINATION LOADING RAMP AND TAILGATE CLOSURE DEVICE

DESCRIPTION

1. Technical Field

This invention relates to a truck bed extension device which also serves as a loading ramp, as for example, for a wheeled vehicle, or the like, which is to be moved into or out of the truck bed.

2. Background Art

Various devices have heretofor been used as ramps for trucks, and specifically trucks having tailgates. These devices facilitate loading and unloading the truck bed. Certain of the prior art devices can be folded or collapsed when not in use. A sample prior art device is disclosed in U.S. Pat. No. 3,339,968. This device includes a pair of pivotally mounted ramp panels which are carried in storage by the tailgate of a truck when not in use as a ramp. Other examples of devices generally relating to the field of the present invention are disclosed in the following U.S. Pat. Nos. 3,352,440; 3,642,156; 3,713,553; 3,756,440; and 3,972,428.

In accordance with various features of the present invention, a combination loading ramp and tailgate closure device for extending the cargo bed of a gated truck is provided. The device is releasably mounted proximate the tailgate of a truck such that the cargo bed is extended by a length approximating the height of the tailgate in the closed position. The device can be readily removed from the rearward portion of the truck with the tailgate extended, and mounted such that it serves as a loading and unloading ramp, as for moving a wheeled vehicle, such as a motorcycle into and out of the truck bed. Other objects and advantages of the present invention will become apparent upon reading the detailed description together with the drawings described as follows.

BRIEF DESCRIPTION OF THE DRAWINGS

FIGS. 4A and 4B depict stop means which assist in forming a substantially coplanar ramp between two adjacent sections of the combination loading ramp and tailgate closure device by limiting the pivoted movement of selected adjacent sections.

FIGS. 5A and 5B depict alternate securing means for securing the device to the side walls of the truck bed.

DISCLOSURE OF THE INVENTION

A combination loading ramp and tailgate closure device is provided for selectively extending the cargo bed of a gated truck and for serving as an on-load and off-load ramp for wheeled vehicles or the like. A device incorporating features of the present invention can be readily changed from its loading ramp mode to its tailgate closure mode for extending the cargo bed. In this connection, means are provided for releasably securing the device to the rearward portion of the truck. In one embodiment, a loading ramp track is provided for moving a wheeled vehicle such as a motorcycle into and out of the truck bed when the device is positioned in its loading ramp mode.

BEST MODE FOR CARRYING OUT THE INVENTION

Figure 1:
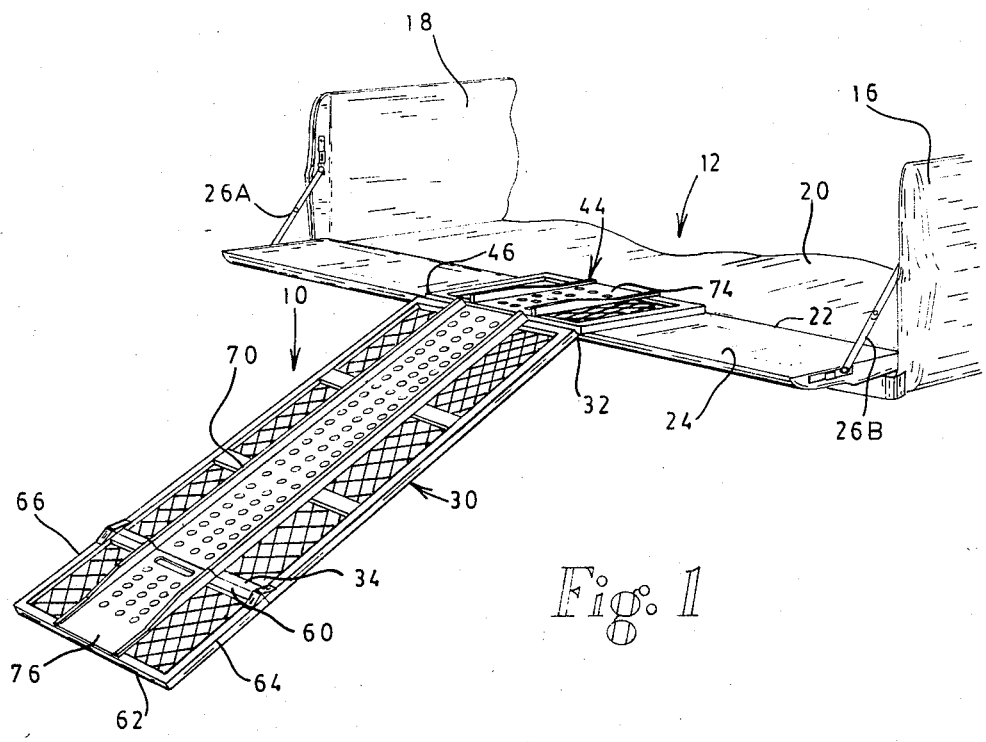
FIG. 1 illustrates a perspective view of the combination loading ramp and tailgate closure device of the present invention mounted in its loading ramp mode.
Figure 2:
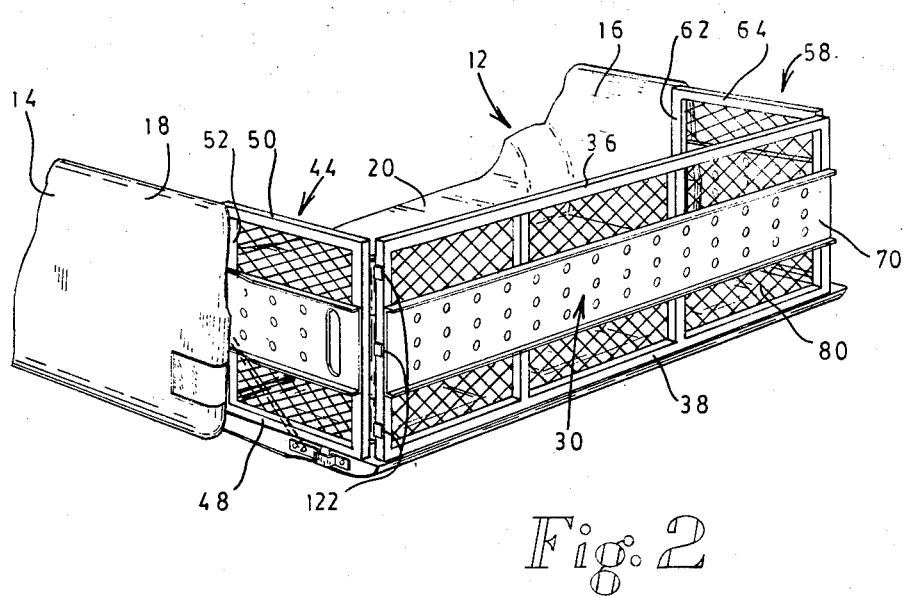
FIG. 2 illustrates a perspective view of the device depicted in FIG. 1 mounted in its tailgate closure mode for extending the cargo bed of a gated truck.

A combination loading ramp and tailgate closure device is indicated generally at 10 in FIG. 1. This device serves to extend the cargo bed 12 of a gated truck 14. More specifically, the bed 12 includes opposite side walls 16 and 18, and a floor having a rearward edge portion 22 (see FIG. 1) upon which is pivotally mounted the tailgate 24. In a conventional manner, when the tailgate 24 is in an upright position (not shown) it closes the rearward portion of the truck bed 12. When the tailgate 24 is in the extended position as illustrated in FIGS. 1 and 2, it forms a platform disposed in a substantially horizontal plane with the floor of the bed 12. The platform formed by the tailgate has a width substantially coextensive with the rearward edge portion of the floor and a length substantially equal to the height of the tailgate when it is upright. This horizontal position of the tailgate is maintained by the tailgate conventional retaining devices such as devices 26A and 26B illustrated in FIG. 1. In some truck beds, chains are used.

As shown in FIG. 1, the device 10 includes a mid section 30 having a first end portion 32 and a further end portion 34. The spacing between the first and further end portions 32 and 34, respectively, such that the length of the mid section 30 is substantially coextensive with the width of the tailgate 24. This mid section 30 further includes an upper side portion 36 and a lower side portion 38. It will be noted that the first and further end portions are connected by the lower and upper side portions, and are spaced by a distance such that the length of this end section is substantially equal to the height of the tailgate when it is upright.

A first end section 44 is pivotally mounted at its first end portion 46 on the first end portion 32 of the mid section 30. The first end section also includes a lower side portion 48 and a upper side portion 50. When the device is used as a ramp as illustrated in FIG. 1, the first end section 44 lays on and is supported by the upper surface of the tailgate 24 such that the further end portion is positioned proximte the floor 20 of the truck bed.

Similarly, a further end section 58 includes a first end portion 60 which is pivotally mounted with the further end portion of the mid section 30. This further end section includes a further end portion 62 which rests on the ground or another supporting surface when the device 10 is employed as a ramp. The first end portion 60 of the section 58 and the further end portion 62 of the section 58 are joined by the upper side portion 64 and the lower side portion 66, forming a substantially rectangular/square section in the illustrated embodiment having a configuration similar to the first end section 44 as illustrated in FIGS. 1 and 2. It will be noted that the first and further end portions are connected by the lower and upper side portions, and are spaced by a distance such that the length of this end section is substantially equal to the height of the tailgate when it is upright.

With the device 10 deployed as a ramp as shown in FIG. 1, a wheeled vehicle can be rolled from the ground level into the bed 12. To facilitate movement of the wheeled vehicle, a ramp track 70 is provided. This track 70 serves as a guide and can be fabricated from a suitable reinforced material such as steel, aluminium or the like. It is provided with a plurality of openings as illustrated to allow fluid to pass therethrough and to give added traction. In the embodiment depicted in FIG. 1, the ramp guide 70 includes a mid section 70, a first end section 74, and a further end section 76 which are mounted in the illustrated embodiment on the side of said device opposite the bed of the truck when said device is mounted as a tailgate closure device as illustrated in FIG. 2. It will be noted that the ramp guide sections are positioned such that they are aligned with the mid section and further end section of the device when deployed as a ramp. Further, the first end section of the ramp guide 70 is aligned with the ramp guide section carried by the mid section of the device. Thus, a wheeled vehicle such as motorcycle can be readily moved along the length of the ramp into the truck with the upstanding walls of the ramp guide serving to guide the wheel along a desired path.

Device 10 is deployed as a tailgate closure device in the position depicted in FIG. 2. In this tailgate closure mode, the device 10 is mounted proximate the rearward end portion of the truck bed such that the lower portion of the device defined by the lower side portion 38 of the mid section, the lower side portion 48 of the first end section, and the lower side portion 66 of the further end section are supported by the perimeter of the tailgate in the extended position. In the position depicted in FIG. 2, the further end portion 62 of the section 58 and the further end portion 52 of the section 44 are positoned proximate the upright edges of the end portions of the side walls 16 and 14, respectively. The first end section and the further end section along their lower side portions are supported by the portions of the perimeter of the tailgate at its opposite end portions, respectively. The lower side portion of the mid section 30 is supported by the perimeter of the tailgate, and is substantially coextensive therewith, along the edge opposite the edge of the tailgate pivotally connected to the rearward edge of the floor of the cargo bed. Thus, an embodiment and mode of deployment depicted in FIG. 2, the device 10 serves as a vertical closure or carrier for closing the portion of the bed above the extended tailgate. This increases the overall effective length of the cargo bed.

It will be noted that the device depicted in FIGS. 1 and 2 includes wire mesh sections 80 which are operatively associated with each of the sections 30, 44, and 58 of the device 10. These wire mesh sections increase the effective width of the ramp such that if the wheel of a vehicle being loaded onto the truck bed slips out of the ramp track 70, it will still be supported by the wire mesh 80. Further, this wire mesh 80 allows the wind and air turbulence to flow through the device 10, thereby retarding the wind resistance of the truck bed carrying this device as a bed extender.

Figure 3A:
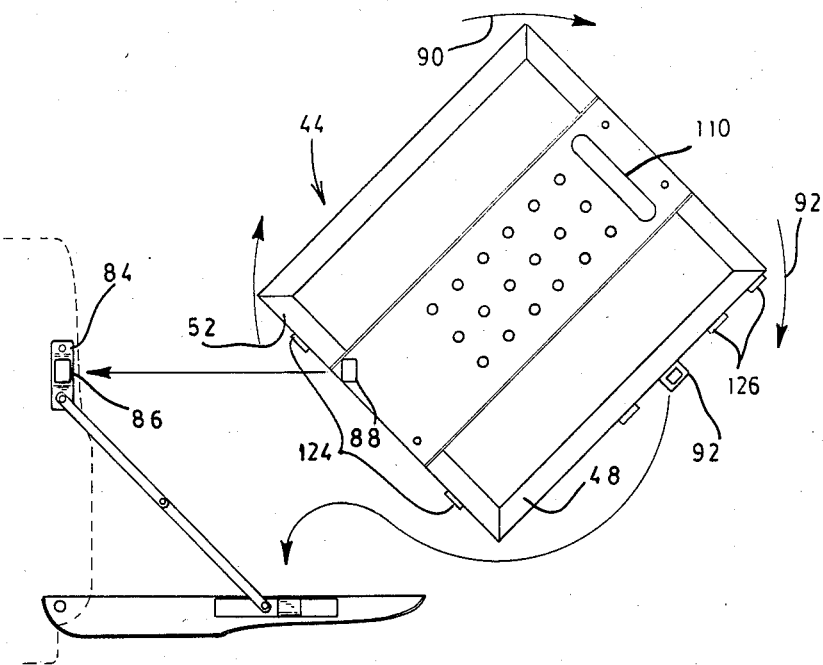
FIG. 3A depicts one embodiment of the device illustrated in FIG. 1 as it is being mounted onto the truck to serve as a tailgate closure device. It will be noted that the device is readily mounted in this embodiment by a rotational movement indicated by the arrows, and the device is simultaneously secured to the side walls of the track and to the tailgate.
Figure 3B:
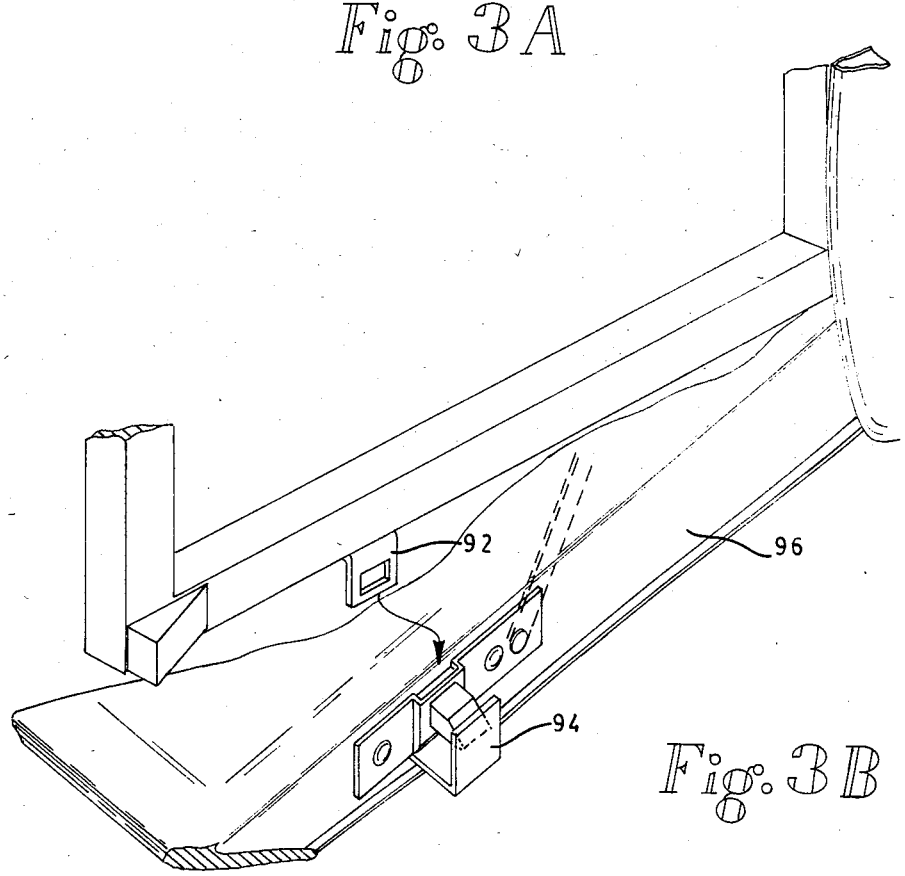
FIG. 3B illustrates means for securing the device to the tailgate in one embodiment.

Means are provided for releasably securing the device at selected locations on the truck such that the device serves as the closure depicted in FIG. 2 for extending a portion of the bed formed by extending the tailgate. More specifically, as depicted in FIG. 3A, a suitable retainer 84 is mounted on the inner surfaces of the side walls 16 and 18 of the truck. Each of these retainers define an opening 86 which is proportioned for receiving the locking stud 88 having an expanded head and carried as illustrated on end sections of the device 10. More specifically, the expanded head of the locking stud 88 is aligned with the opening 86 in the retainer 84, and the device is rotated in the direction of the arrows 90 and 92 such that the first and further end sections are secured to the side walls of the truck. As the device 10 is rotated in the direction of the arrows 90 and 92 in FIG. 3A, the latch retainer member 92 is received in the conventional latch operater mechanism 94 carried on the side wall 96 of the tailgate 24. Thus, movement of the device as indicated by the arrows 90 and 92 secures the lower side portion of the end section to the tailgate, and the opposite end portions of the device to the side walls.

Alternate means for securing the device 10 to the side walls of the truck bed are illustrated in FIGS. 5A and 5B. More specifically, in FIG. 5A a suitable securing member 100 is mounted on the internal surface of the truck side wall. This member 100 carries a bent stud 102 which is received in a operatively associated cyclindrical member 104 carried by a juxtaposed edge of the mid section 30 of the device. A rubber or other suitable padding member 106 serves to prevent scarring of the truck bed.

In FIG. 5B, the receiving member 104' is mounted on the side wall 16 of the truck bed and a suitable bent stud 102' is carried by the securing member 100' mounted on the mid section 30 of the device 10.

It will, of course, be recognized that each end portion of the mid section 30 will be releasably secured to the juxtaposed side wall of the truck bed by the devices illustrated in FIGS. 5A and 5B, if it is desirable to use these devices for securement.

In order to facilitate handling of the device 10 during the securing operation, suitable end grips indicated generally at 110 are provided in the ramp track 70 in the sections carried by the first and further end sections of the device. These handle or grip openings allow an operator to firmly grip the device and move it into position.

Stop means serve to stop the pivotal movement of at least one end portion of the mid section with respect to a juxtaposed and pivotally connected end portion of the end section, such that the mid section and the further end section are pivotally moved and fixed in a substantially coplanar relationship by the stop means generally indicated at 114 and 114' in FIGS. 4A and 4B. In the embodiment depicted in FIG. 4A, a stop means 114 includes a first member 116 which is mounted on the end portion 34 of the mid section 30. This stop means is operatively associated with the stop means member 118 carried by the end portion 60 of the further end section 58. It will be noted that in the depicted stop members comprise a substantially triangular shaped cross sectional outline and are fabricated from a metal (or other suitable material) bar bent such that the stop means abutt at the location defined at 120. The abutting members 116 and 118 terminate the pivotal motion of the mid section 30 with respect to the further end section 58. Similarly, the stop means depicted in 4B serves to terminate the pivotal movement of the mid section 30 with respect to the further end section 58 at a selected location to form a substantially coplanar relationship between these members, as is the case with reference to FIG. 4A. However, it will be noted that the members 116' and 118' are fabricated from substantially solid material such as suitable steel, aluminum or the like, and will provide greater reinforcement than the stop means illustrated in FIG. 4A. Thus, the stop means depicted in FIG. 4B will be used for heavier weights. The operation of the stop means 114 is more broadly depicted in FIG. 1 where it is shown that the further section and mid section of the ramp are positioned in substantially coplanar relationships as a result of the utilization of such stop means.

Additional stop means 122 are disposed between the abutting portions of the mid and first section of the device 10 as shown in FIG. 2. These stop means comprise members welded onto the illustrated end portion 32 of the section 30 which limit the pivotal movement of the mid and first sections with respect to each other such that the section 44 lays on the truck bed as shown in FIG. 1.

Pads can be provided as desired to reduce wear, slippage between the truck and the device 10 and/or reduce vibration. For example, pads 124 as illustrated in FIG. 3A can be mounted on end portion 52 of section 44 to reduce vibration and/or scarring. Similarly, pads 126 can be carried by the lower side portion 48 of section 44 to assist in preventing scarring of the tailgate.

From the foregoing detailed description, it will be recognized by those skilled in the art that a combination loading ramp and tailgate closure device for extending the cargo bed of a gated truck has been provided. This device can be readily released from its deployment as a bed closure for the tailgate portion of the truck bed, and used as an on-loading and off-loading ramp. Further, the device in one embodiment is designed such that the wind resistance created by use of the device as a bed extender is reduced. The strength and materials of the device can be varied to fit the weight requirements for the loading operation.

It is, of course, understood that although preferred embodiments of the present invention have been illustrated and described, various modifications thereof will become apparant to those skilled in the art, and, the scope of the present invention should be defined only by the appended claims and equivalents thereof.

I claim:

1. A combination loading ramp and tailgate closure device for extending the cargo bed of a gated truck, said bed including opposite side walls, a floor having a rearward edge portion and a tailgate pivotally mounted at the rearward edge portion of the floor of the truck bed such that when the tailgate is in an upright position, it closes the rearward portion of the truck bed, and when the tailgate is in an extended position, it forms a platform disposed in a substantially horizontal plane with the floor of the bed, said platform formed by said tailgate having a width substantially coextensive with the rearward edge portion of the floor and a length substantially equal to the heighth of the tailgate when it is in its upright position, said combination loading ramp and tailgate closure device being releasably connected to the tailgate and rearward portions of the side walls of the truck bed to alternately form, first an upright closure around the periphery of the extended tailgate, and further a ramp for loading said bed when said device is deployed as a ramp, said device including:

a mid section including a first end portion and a further end portion, an upper side portion and a lower side portion, said mid section having a length substantially coextensive with said tailgate width;

a first end section, including a first end portion and a further end portion, a lower side portion and an upper side portion, said first and further end portions being connected by said lower and upper side portions and spaced by a distance such that the length of said first end section is substantially equal to the height of said tailgate, said first end portion being pivotally mounted on said first end portion of said mid section;

a further end section including a first end portion and a further end portion and a lower side portion and an upper side portion, said first and further end portions being connected by said lower and upper side portions and spaced by distance such that the length of said further end section is substantially equal to the height of said tailgate, said first end portion being pivotally mounted on the further end portion of said mid section;

securing means for releasably securing said device at selected locations on said truck whereby said device serves as a closure for said extended tailgate thereby effectively extending said bed by a length substantially equal to the height of said tailgate in its upright position; and stop means serving to stop the pivotal movement of at least one end portion of said further section with respect to its juxtaposed end portion of said mid section, whereby said mid section and said further end section are pivotally moved and fixed in a substantially coplanar relationship by said stop means such that the first end portion of said device can be positioned on the extended tailgate of said truck and supported thereby, and the mid section and further section of said device serves to form a ramp, as for rolling a wheeled vehicle onto the truck bed.

2. The combination loading ramp and tailgate closure device of claim 1 wherein said mid section, said first end section, and said further end section, each include a wire mesh extending between said first end portion, said further end portion, said upper side portion, and said lower side portion of each of said sections thereby allowing air to pass through said device when it is used to close the tailgate portion of said bed.

3. The device of claim 2 wherein each of said sections carries a ramp track section operatively associated therewith such that when said device is used as a ramp, said ramp track sections are aligned thereby supporting a wheeled vehicle moving over said ramp into said truck bed.

4. The device of claim 3 wherein at least two of said ramp track sections define handle means to facilitate gripping said device by an operator.

5. The device of claim 1 wherein said securing means for releasably securing said device at selected locations on said truck serves to secure said device to the side walls of said truck bed and to said tailgate.

6. The device of claim 5 wherein said securing means simultaneously secures said device to said side walls of said truck bed and said tailgate upon movement of said device into position for closing the platform defined by the extended tailgate.

7. The device of claim 1 including further stop means serving to stop the pivotal movement of at least one end portion of said first end section with respect to its juxtaposed end portion of said mid section, whereby said mid section and said first end section are pivotally moved and fixed in a preselected angular relationship such that said further end section can be readily positioned on extended tailgate when said device is used as a ramp.

8. A combination loading ramp and tailgate closure device for extending the cargo bed of a gated truck, said bed including opposite side walls, a floor having a rearward edge portion and a tailgate pivotally mounted at the rearward edge portion of the floor of the truck bed such that when the tailgate is in an upright position, it closes the rearward portion of the truck bed, and when the tailgate is in an extended position, it forms a platform disposed in a substantially horizontal plane with the floor of the bed, said platform formed by said tailgate having a width substantially coextensive with the rearward edge portion of the floor and a length substantially equal to the heighth of the tailgate when it is in its upright position, said combination loading ramp and tailgate closure device being releasably connected to the tailgate/rearward portions of the side walls of the truck bed to alternately form, first an upright closure about the extended tailgate, and further a ramp for loading said bed when said device is deployed as a ramp, said device including:

a mid section including a first end portion and a further end portion, an upper side portion and a lower side portion, said mid section having a length substantially coextensive with said tailgate width;

a first end section, including a first end portion and a further end portion, a lower side portion and an upper side portion, said first and further end portions being connected by said lower and upper side portions and spaced by a distance such that the length of said first end section is substantially equal to the height of said tailgate, said first end portion being pivotally mounted on said first end portion of said mid section;

a further end section including a first end portion and a further end portion and a lower side portion and an upper side portion, said first and further end portions being connected by said lower and upper side portions and spaced by distance such that the length of said further end section is substantially equal to the height of said tailgate, said first end portion being pivotally mounted on the further end portion of said mid section;

said mid section, said first end section, and said further end section, each include a wire mesh extending between said first end portion, said further end portion, said upper side portion, and said lower side portion of each of said sections thereby allowing air to pass through said device when it is used to close the tailgate portion of said bed, and wherein each of said mid, first end and further end sections carries a ramp track section operatively associated therewith such that when said device is used as a ramp, said ramp track sections are aligned thereby supporting a wheeled vehicle moving over said ramp into said truck bed;

securing means for releasably securing said device at selected locations on said truck whereby said device serves as a closure for said extended tailgate thereby effectively extending said bed by a length substantially equal to the height of said tailgate in its upright position, said securing means serving to secure said device to the side walls of said truck bed and to said tailgate; and stop means serving to stop the pivotal movement of at least one end portion of said further section with respect to its juxtaposed end portion of said mid section, whereby said mid section and said further end section are pivotally moved and fixed in a substantially coplanar relationship by said stop means such that the first end portion of said device can be positioned on the extended tailgate of said truck and supported thereby, and the mid section and further section of said device serves to form a ramp, as for rolling a wheeled vehicle onto the truck bed.

9. The device of claim 8 wherein at least two of said ramp track sections define handle means to facilitate gripping said device by an operator.

10. The device of claim 9 wherein said securing means simultaneously secures said device to said side walls of said truck bed and said tailgate upon movement of said device into posistion for loosing the platform defined by the extended tailgate.

11. The device of claim 10 including further stop means serving to stop the pivotal movement of at least one end portion of said first end section with respect to its juxtaposed end portion of said mid section, whereby said mid section and said first end section are pivotally moved and fixed in a preselected angular relationship, such that said further end section can be readily positioned on said extended tailgate when said device is used as a ramp.

12. A combination loading ramp and tailgate closure device for extending the cargo bed of a gated truck, said bed including opposite side walls, a floor having a rearward edge portion and a tailgate pivotally mounted at the rearward edge portion of the floor of the truck bed such that when the tailgate is in an upright position, it closes the rearward portion of the truck bed, and when the tailgate is in an extended position, it forms a platform disposed in a substantially horizontal plane with the floor of the bed, said platform formed by said tailgate having a width substantially coextensive with the rearward edge portion of the floor and a length substantially equal to the heighth of the tailgate when it is in its upright position, said combination loading ramp and tailgate closure device being releasably connected to the tailgate/rearward portions of the side walls of the truck bed to alternately form, first an upright closure about the extended tailgate, and further a ramp for loading said bed when said device is deployed as a ramp, said device including:

a mid section including a first end portion and a further end portion, an upper side portion and a lower side portion, said mid section having a length substantially coextensive with said tailgate width;

a first end section, including a first end portion and a further end portion, a lower side portion and an upper side portion, said first and further end portions being connected by said lower and upper side portions and spaced by a distance such that the length of said first end section is substantially equal to the height of said tailgate, said first end portion being pivotally mounted on said first end portion of said mid section;

a further end section including a first end portion and a further end portion and a lower side portion and an upper side portion, said first and further end portions being connected by said lower and upper side portions and spaced by distance such that the length of said further end section is substantially equal to the height of said tailgate, said first end portion being pivotally mounted on the further end portion of said mid section;

securing means for releasably securing said device at selected locations on said truck whereby said device serves as a closure for said extended tailgate thereby effectively extending said bed by a length substantially equal to the height of said tailgate in its upright position, said securing means serving to secure said device to the side walls of said truck bed and to said tailgate;

stop means serving to stop the pivotal movement of at least one end portion of said further section with respect to its juxtaposed end portion of said mid section, whereby said mid section and said further end section are pivotally moved and fixed in a substantially coplanar relationship by said stop means such that the first end portion of said device can be positioned on the extended tailgate of said truck and supported thereby, and the mid section and further section of said device serve to form a ramp, as for rolling a wheeled vehicle onto the truck bed; and further stop means serving to stop the pivotal movement of at least one end portion of said first end section with respect to its juxtaposed end portion of said mid section, whereby said mid section and said first end section are pivotally moved and fixed in a preselected angular relationship such that said further end section can be readily positioned on extended tailgate when said device is used as a ramp.

13. The device of claim 12 wherein at least two of said ramp track sections define handle means to facilitate gripping said device by an operator.

14. The device of claim 13 wherein said securing means simultaneously secures said device to said side walls of said truck bed and said tailgate upon movement of said device into position for closing the platform defined by the extended tailgate.

* * * * *